Sept. 9, 1941.   W. P. MOOREFIELD   2,255,266
PHOTOGRAPHIC TIMING DEVICE
Original Filed Nov. 15, 1935

Inventor
William P. Moorefield
By A. Yates Dowell
Attorney

Patented Sept. 9, 1941

2,255,266

UNITED STATES PATENT OFFICE 2,255,266

PHOTOGRAPHIC TIMING DEVICE

William P. Moorefield, St. Petersburg, Fla., assignor, by mesne assignments, to Automatic Electrical Devices, Inc., St. Petersburg, Fla., a corporation Application November 15, 1935, Serial No. 50,051
Renewed December 2, 1939

4 Claims. (Cl. 161—18)

This invention relates to photographic timing devices and particularly to a photographic timing device electrically operated which will accurately time and photograph the finish of a race.

In prior automatic timing installations using a photoelectric cell and a projected beam for starting and stopping race timing devices, no provisions have been made for preventing accidental operation of the system, for permitting operation in races where the participants must run more than one lap or for other desirable features forming a part of this invention.

In accordance with this invention a photographic timing device is provided that utilizes a group of photoelectric or other beam sensitive members, each member acted upon by a projected light beam or analogous high frequency beam. This group will operate an associated relay only when a predetermined number of these cells and beams have been interrupted. One group of cells and beam projectors are located at the starting point of the race and when these cells are interrupted by the body of one or more of the participants a timing mechanism is set in operation in the judge's stand.

At the finish line is located another similar group of cells and beam projectors. Associated with this second group are devices which will automatically and/or manually prevent the operation of their associated timing mechanism until the actual finish of the race is at hand. For example assuming the device embodying this invention should be in use at a mile track for judging a mile and one-half horse race. When the horses break from the barrier or their stalls as the case may be, at the start of a race the group of cells at the starting line will be interrupted and by means of an electric circuit and suitable relays will set a timing mechanism in operation in the judge's stand. At the same time a contact may be opened in clock mechanism that will prevent operation of the judging mechanism until a period of forty-five seconds or other predetermined length of time has elapsed. This device will enable the participants to pass the judge's stand the first time without stopping the judging mechanism.

A camera is located within focal range of the finish line, the said camera being electrically connected for operation by photo-electric cells or high frequency beam-sensitive members when a predetermined number of beams projected into said members are interrupted. Should the beams be cut one at a time, for example, the camera will not be operated, but should a predetermined number of these beams, for example two or more, be interrupted, then the electric circuit is so balanced as to cause the camera to operate. This arrangement tends towards a high degree of accuracy in correctly timing and photographing the finish of a race.

Mechanism is also associated with the device illustrative of this invention that will permit a judge to take care of a contingency such as for example, a horse being left at the post and subsequently running away and crossing the nominal finishing line after the predetermined automatic time set has elapsed. By merely pushing a button and opening a circuit as the horse is coming down the track, the judge can prevent operation of the photo timing device as this runaway horse crosses the nominal finishing line.

The circuit governing the photo timing device is provided with two relays, one of which opens the clock starting circuit when the impulse starting the timing mechanism is received, and the other of which opens the finish line circuit when the impulse governing the photo timing operation at the end of the race is received. By virtue of these two relays the photo timing starting and stopping devices each receive a single impulse only, so that the timing is recorded from the time when the first participant at the start crosses the starting line and when the first participant at the end of the race crosses the finish line. This relay arrangement prevents subsequent operation or chattering of the photo timing device due to an uneven start or finish and the relays must be set from the judge's stand or some other convenient place before the device will operate at all. This setting may be accomplished by means of a push button which closes a presetting circuit.

Objects of this invention will be apparent to those skilled in this particular art from the claims and description in the specification taken in connection with the drawing in which:

Figure 1:
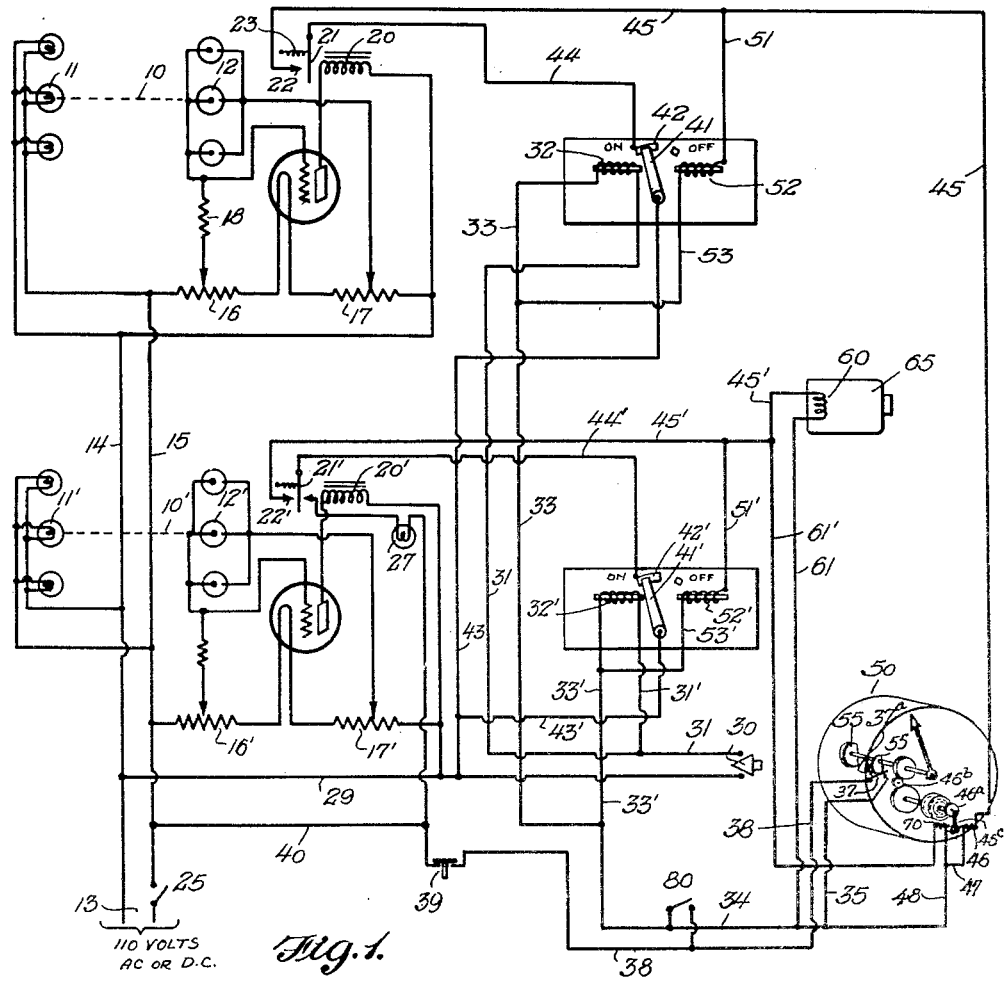
Fig. 1 is a wiring diagram illustrative of this invention.
Figure 2:
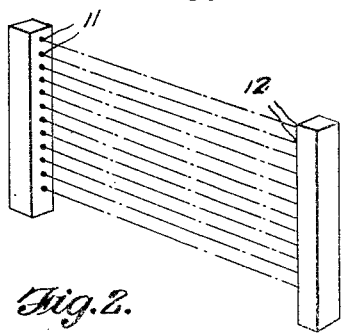
Fig. 2 is a diagrammatic showing of high frequency beam projectors and their associated beam sensitive cells.

In the embodiment of the invention which has been chosen for the purpose of illustration and referring now to Fig. 1 of the drawing, at 10 is shown a starting line of a race track. At this point a plurality of beam projectors 11 and beam sensitive cells 12 is disposed on opposite sides of the track. These cells and their arrangement are diagrammatically shown in Fig. 2. Power for the beam projectors and the light sensitive cell is derived from a power line 13 which may be an A. C. or D. C. power source.

For purposes of illustration and description this line is indicated as having a positive side 14 and a negative side 15. The light sensitive cells are connected in a vacuum tube amplifying circuit characterized by a pair of balanced resistances 16 and 17 which determine the amount of current flowing through a filament and a high resistance element 18 connected in the circuit from one side of the power line to the light sensitive cells 12. The plate circuit of the amplifying circuit includes a coil 20 of a relay. When power is impressed upon the circuit, sufficient current flows through the coil 20 to attract armature 21, away from a contact 22, and hold its associated circuit in open position. A spring 23 tends to pull the armature 21 against the contact 22 and hold it in closed position.

With this circuit properly connected because of the values of the resistances 16 and 17 and the mechanical strength of the spring 23, the current flowing through the coil 20 is such that it requires an interruption of a plurality of the beam members to so reduce the strength of current flowing through the coil 20 that the spring 23 will attract the armature 21 and close it to contact. This feature of design forms a part of the invention and it prevents to a large extent unintentional operation of the photo timing device. For example, should it be necessary for six out of twelve of the beams to be interrupted before the contact 22 is closed, it would obviously require a body of considerable size to break a sufficient number of beams and set the device in operation. This feature will prevent operation of the device if a bird flies across the starting line or if a piece of paper or some other object should be blown across the beam path.

By having a plurality of beams arranged in substantially vertical alignment and the circuit so balanced as to operate the camera hereinafter referred to only unless a predetermined number of beams are interrupted a more accurate photo-finish of the race may be obtained than is possible where only a single beam is used. In this connection, it should be borne in mind that the circuit may be so balanced as to not cause a camera to operate should the beams be cut one at a time, or even two or more at a time. Thus, should a dog's or horse's foot cut down across the beams, the camera will remain inoperative, but should the beams be interrupted by an object the size of a horse's nose or face, then the camera will immediately operate and take a correct photograph of the finish.

To put this device in operation to judge a race, a switch 25 is closed in the power line 13 and power is supplied to the beam projecting and beam sensitive members at the starting line 10 and their associated amplifying circuit and also to similar beam projecting and beam sensitive devices located at the finish line 10'. This finish line actuating device has a similar amplifying circuit forming a relay control similar to that located at the starting point and its specific function and features will be described in connection with its operation.

When power has been applied to the tubes of the amplifying circuits at the start and finish line for a sufficient length of time for them to warm up, current flowing through their plate circuits and the coils 20 and 20' will be of sufficient strength to attract armatures 21 and 21' and open contacts 22, 22'. When the armature 21' is attracted and its circuit open this circuit is closed through a pilot light 27 which may be located in the judge's stand and this will inform the judge that the circuit is ready to be set for operation.

To set the circuit of the race judging device ready for operation a button switch 30 is closed. This switch permits current to flow from the line 14 through line 29 to switch 30, line 31, coil 32, line 33, line 34, lead 35, switch 37, to be described in detail later, lead 38, button switch 39 and line 40 to the opposite side 15 of the line 13. This current flowing through the coil 32 attracts an armature 41 and closes a contact 42. At the same time this operation is going on, current flows from line 31 through a branch 31' and leads current through a second relay coil 32' and back to line 34 from where it traverses lead 35, switch 37, lead 38, switch 39, line 40 back to opposite side 15 of power line 13. Current flowing through the coil 32' attracts armature 41' and closes the contact 42' in the manner previously described in connection with armature 41. With the armatures 41, 41' in closed or set position the photoelectric timing device is ready to operate.

Assuming now the start of a race to be judged. The participants cross the starting line 10, breaking beam circuit 11 and 12 which causes a diminution in the current flowing through the coil 20 and permitting contact 21, 22 to close under the action of the spring 23. Upon closure of this circuit, current flows from the line 14 through line 29, line 43, armature 41, contact 42, line 44, contacts 21, 22, line 45, coil 46, line 47, line 48, lead 35, switch 37, lead 38, switch 39, line 40 back to side 15 of power line 13. The current flowing through the coil 46 starts the timing mechanism in a clock 50. The clock 50 may be of any desired type operating on the "stop-watch" principle. For the purposes of illustration, it is shown as of the mechanical spring wound type having a brake disc 46a connecting with a chain of clock gears 46b. The coil 46 constitutes a solenoid adapted to attract an armature brake 46c. When the coil 46 is energized, the brake is retracted clear of the disc 46a, permitting the clock to start.

At the same time current is flowing through the coil 46, a branch lead 51 connected with the line 45 carries current through a coil 52, line 53 connected to the line 33 from where it flows to the side 15 of the power line 13 through line 34, lead 35, switch 37, lead 38, switch 39, line 40. The current flowing through the coil 52 attracts armature 41 and pulls it off contact 42 to open or unset position. In connection with this operation it is to be noted that the contact 42 is of considerable length so that notwithstanding the fact that it opens the circuit permitting current to flow through the time starting mechanism coil 46, it will stay closed a sufficient length of time so that the same electric impulse that opened this contact will have sufficient time to start the timing mechanism.

Referring now particularly to the switch 37 this switch is engaged by a selected one of a group of cams 55 and is normally maintained in closed position by the cam. The cams 55 are so shaped, however, that when the timing mechanism is started, the switch 37 is allowed to spring open due to the action of spring 37a. The design of the cams is such that this switch is allowed to remain open for a predetermined period of time such as for example, fifteen, thirty or forty-five seconds. After the elapse of the predetermined time, determined by the design of the cam which engages the switch, the cam will move the switch 37 to closed position. By virtue of this construction the photo timing device illustrative of this invention may be readily used on a mile track for judging a mile and a sixteenth, a mile and a quarter or any other race wherein it is necessary for the participants to cross the nominal finish line more than once.

To continue the description in connection with the mile and a sixteenth race assume that the switch 37 is engaged by a cam permitting it to remain open for thirty seconds following the actuation of the timing mechanism. The participants of the race have crossed the starting line 10, the timing mechanism has been started and the switch 37 has been automatically opened. The participants will cross the finish line 10' and notwithstanding the fact that the armature 21' will close and remain closed until all of the participants have passed the finish line, the judging mechanism will not be affected due to the fact that when switch 37 is open no current will flow through the judging mechanism. After the elapse of the selected thirty second time interval and after all of the participants have crossed the nominal finish line 10', the switch 37 will be closed by means of the selected cam 55.

When the participants next cross the finish line 10' marking the end of the race, the breaking of the beam circuit 11', 12' will cause a diminution in current through the coil 20', closing the contacts 21', 22' and current will flow from side 14 of the line 13 through line 43, branch 43', armature 41', lead 44', armature 21', contact 22', line 45', relay 60, lead 61 to line 34 from where it goes through lead 35, switch 37, lead 38, switch 39, line 40, to side 15 of power line 13. Current flowing through the coil 60 actuates the camera 65 and takes a photograph of the finish of the race. At the same time current from the line 45' traverses a line 61' and goes through a coil 70 in the timing mechanism 50. From there it goes to the line 48, lead 35, switch 37, lead 38, switch 39, to line 40 joining side 15 to power line 13. Current flowing through solenoid 70 attracts armature brake 46c and causes the latter to engage the brake disc 46a, to thereby stop the timing mechanism and accurately time the race.

At the same time the race judging circuits are closed through coils 60 and 70 and photographing and timing the race, a branch 51' connected with line 45' carries current to a coil 52', lead 53', lead 33' to line 34 and thence through lead 35, switch 37, lead 38, switch 39, line 40 back to side 15 of power line 13. The current flowing through the coil 52' attracts the armature 51' and pulls it off contact 42'. The contact 42' has the same general dimensions as the contact 42 so that notwithstanding the fact that a single impulse opens this contact which in turn opens a contact in the circuit of the finish line judging mechanism, the contact 41', 24' will not be opened until the impulses traversing coils 60 and 70 have had time to actuate the camera 65 and the stopping mechanism respectively.

The switch 39, located between lines 38 and 40 in a common return to side 15 of power line 13, is normally located in the judge's stand and will take care of any contingencies such as for example a horse balking and being left at the post and subsequently running away and crossing the finish line after the predetermined time governing time switch 37, has elapsed. Should this contingency arise the judge has merely to press the button 39 and open the circuit between lines 38 and 40 as the horse crosses the finish line and the judging mechanism will not operate but will be ready to operate as soon as this switch 39 is allowed to close. Similarly a switch 80 is provided between lines 34 and 38 which may be operated manually to take the place of the automatic time switch 37. If it is desired to use the switch 80 instead of the automatic switch 37 it is only necessary to remove the switch 37 from contact with any cam so that it will remain open.

It will be obvious to those skilled in the art that various changes may be made in this device without departing from the spirit of the invention and therefore is not limited to what is shown in the drawing and described in the specification but only as indicated in the appended claims.

I claim:

1. In a timing device having a beam controlled circuit for starting a timing mechanism and a beam controlled circuit for stopping said timing mechanism, means connected with said mechanism stopping circuit for preventing operation thereof until a predetermined time interval has elapsed, said means including a switch controlled by a cam with said cam actuated by said timing mechanism.

2. In a timing device including a light beam projector and a beam sensitive receiver, a timing mechanism, a beam controlled electric circuit responsive to interruption of a beam from said projector for starting said timing mechanism, means including another light beam projector and beam sensitive receiver and associated electric circuit responsive to interruption of a beam from said latter projector for stopping said timing mechanism, a switch for preventing operation of said stopping means when in open position, means associated with said timing mechanism for maintaining said switch in open position and means associated with said timing mechanism for closing said switch.

3. In a timing device for judging races, a light beam projector and a beam sensitive receiver located at a race starting point, timing mechanism, an electric circuit responsive to interruption of the beam projected from said beam projecting device for starting the timing mechanism, another beam projector and receiver located at a finish line, a second electric circuit responsive to interruption of the beam projected from said second beam projecting device for stopping said timing mechanism, and means associated with said second circuit to maintain the said timing mechanism in operation irrespective of premature interruption of the beam projected from said projector at the finish line until a predetermined period of time has elapsed.

4. In a timing device for judging races, a light beam projector and a beam sensitive receiver located at a race starting point, timing mechanism, an electric circuit responsive to interruption of the beam projected from said beam projecting device for starting the timing mechanism, a second beam projector and receiver located at the finish line, a second electric circuit responsive to interruption of the beam projected from said second beam projecting device for stopping said timing mechanism, and means associated with said second circuit to maintain the said timing mechanism in operation irrespective of premature interruption of the beam projected from said projector at the finish line until a predetermined period of time has elapsed, said means including a switch actuated by said timing mechanism.

WILLIAM P. MOOREFIELD.